United States Patent [19]
Kuth et al.

[11] 3,778,228
[45] Dec. 11, 1973

[54] PROCESS FOR THE CONTINUOUS DYEING AND PRINTING OF FIBRE MATERIALS OF SYNTHETIC POLYAMIDES

[75] Inventors: Robert Kuth, Cologne; Dietrich Hildebrand, Odenthal; Hans-Samuel Bien, Burscheid, all of Germany

[73] Assignee: Bayer Aktiengesellschaft, Leverkusen, Germany

[22] Filed: Aug. 6, 1970

[21] Appl. No.: 61,805

[30] Foreign Application Priority Data
Aug. 13, 1969 Germany................. P 19 41 105.3

[52] U.S. Cl............................. 8/174, 8/94, 8/175, 8/178 R
[51] Int. Cl............................................. D06p 1/68
[58] Field of Search................. 8/6, 178 R, 174, 8/175, 94

[56] References Cited
UNITED STATES PATENTS

| | | | |
|---|---|---|---|
| 3,502,495 | 3/1970 | Akamatsu | 8/4 X |
| 3,524,718 | 8/1970 | Nador et al. | 8/93 X |
| 2,721,111 | 10/1955 | Long et al. | 8/6 X |
| 3,164,449 | 1/1965 | Buxbaum | 8/6 X |
| 2,053,616 | 9/1936 | Landolt | 8/84 |
| 2,663,613 | 12/1953 | Gibson | 8/4 X |
| 3,510,243 | 5/1970 | Seuret et al. | 8/174 X |

FOREIGN PATENTS OR APPLICATIONS

| | | | |
|---|---|---|---|
| 1,217,380 | 12/1970 | Great Britain | 8/174 |
| 454,084 | 6/1968 | Switzerland | 8/178 R |
| 1,560,532 | 2/1969 | France | 8/178 R |

OTHER PUBLICATIONS

Colour Index, Second Edition 1956, Vol. 2, pp. 2815 and 2816.

Primary Examiner—Herbert B. Guynn
Assistant Examiner—T. J. Herbert, Jr.
Attorney—Plumley & Tyner

[57] ABSTRACT

Thermosol process for the continuous dyeing and printing of fibre materials of synthetic polyamides from organic solvents with dyestuffs containing carboxylic and/or sulphonic acid groups, characterised in that dyeing or printing is carried out with chlorinated hydrocarbon dyestuff liquors which contain amine salts or amine addition products of dyestuffs containing carboxylic and/or sulphonic acid groups, which are derived from an amine containing at least eight carbon atoms and exhibiting an uninterrupted chain of at least three carbon atoms. With the aid of the process according to the invention it is possible to produce on fibre materials of synthetic polyamides intense, level and well developed dyeings and prints with an excellent dyestuff yield.

5 Claims, No Drawings

3,778,228

PROCESS FOR THE CONTINUOUS DYEING AND PRINTING OF FIBRE MATERIALS OF SYNTHETIC POLYAMIDES

The invention relates to a thermosol process for the continuous dyeing and printing of fibre materials of synthetic polyamides from organic solvents with dyestuffs containing carboxylic and/or sulphonic acid groups; the process is characterised in that dyeing or printing is carried out with chlorinated hydrocarbon dyebaths which contain amine salts or amine addition products of dyestuffs containing carboxylic and/or sulphonic acid groups, which are derived from an amine containing at least eight carbon atoms and exhibiting an uninterrupted chain of at least three carbon atoms.

Chlorinated hydrocarbons suitable for the process according to the invention are those chlorinated hydrocarbons the boiling points of which lie between 30° and 190°C, e.g. aliphatic chlorinated hydrocarbons such as methylene chloride, chloroform, carbon tetrachloride, 1,1-dichloroethane, 1,2-dichloro-ethane, 1,1,1-trichloroethane, 1,1,2-trichloroethane, 1,1,1,2-tetrachloroethane, 1,1,2,2-tetrachloroethane, pentachloroethane, 1-chloropropane, 1,2-dichloropropane, 1-chlorobutane, 2-chlorobutane, 1,4-dichlorobutane, 1-chloro-2-methyl-propane, 2-chloro-2-methyl-propane, or 4-chloro-2-methyl-butane; and aromatic chlorinated hydrocarbons such as chlorobenzene and chlorotoluene.

Tetrachloroethylene, trichloroethylene and 1,1,1-trichloropropane have proved especially satisfactory.

Suitable dyestuffs which contain carboxylic and/or sulphonic acid groups and are used according to the invention in the form of their amine salts or amine addition products, are all dyestuffs which contain 1 to 4 carboxylic acid and/or sulphonic acid groups. They may belong to a great variety of dyestuff classes, for example, to the azo, anthraquinone, phthalocyanine, azine and triphenyl-methane dyestuffs. These dyestuffs may also contain reactive groups. The dyestuffs include optical brightening agents, e.g. brightening agents from the stilbene, coumarin, azole or naphthalimide series.

Suitable amines containing at least eight carbon atoms and exhibiting an uninterrupted chain of three carbon atoms, from which the dyestuff amine salts or amine addition products to be used according to the invention are derived, include primary, secondary and tertiary monoamines as well as primary, secondary and tertiary polyamines. Examples of primary, secondary and tertiary monoamines are optionally substituted aliphatic amines, such as tri-n-propylamine,
2-ethyl-hexylamine,
dodecylamine,
dodecylamine polyglycol ether with 20 mol ethylene oxide,
hexadecylamine,
hexadecylamine polyglycol ether with 20 mol ethylene oxide,
octadecylamine,
N-methyl-octadecylamine,
N-methyl-octadecylamine polyglycol ether with 20 mol ethylene oxide,
cetylamine,
N,N-dimethyl-dodecylamine,
N,N-dimethyl-hexadecylamine,
N,N-dimethyl-octadecylamine,
N,N-dibutyl-dodecylamine,
N,N-di-2-hydroxyethyl-oleylamine,
N,N-dimethyl-N-(dodecanoylaminomethyl)-amino,
N-methyl-N-2-hydroxyethyl-N-[γ-(octadecanoylamino)-propyl]-amine,
ε-aminocapronic acid butyl ester,
ε-aminocapronic acid dodecylamide,
ε-aminoundecanic acid butyl ester;

furthermore, technical mixtures of fatty amines such as coconut oil fatty amine and sperm oil fatty amine, as well as their ethoxylation and propoxylation products;

optionally substituted cycloaliphatic amines, such as
N,N-dimethyl-cyclohexylamine,
N-ethyl-cyclohexylamine,
N-2-hydroxyethyl-cyclohexylamine,
N,N-bis-(2-hydroxyethyl)-cyclohexylamine,
N,N-bis-(2-chloroethyl)-cyclohexylamine,
1-cyclohexylamino-propanol-2,
1-cyclohexylamino-propylamine-3 and dicyclohexylamine;

optionally substituted araliphatic amines, such as
benzylamine,
N,N-dimethyl-benzylamine,
N,N-dibenzylamine,
N-methyl-N,N-dibenzyl-amine,
1-amino-1-phenyl-ethane,
1-amino-2-phenyl-ethane;

optionally substituted aromatic amines, such as
N-ethyl-aniline,
N,N-dimethyl-aniline,
N,N-diethyl-aniline,
N-propyl-aniline,
N,N-dipropyl-aniline,
N-butyl-aniline,
N-isobutyl-aniline,
N-(2-chloroethyl)-N-butyl-aniline,
N-2-hydroxyethyl-aniline,
N-methyl-N-(2-hydroxyethyl)-aniline,
N-butyl-N-(2-hydroxyethyl)-aniline,
N,N-bis-(2-hydroxyethyl)-aniline,
N-methyl-N-(2-cyanoethyl)-aniline,
2-amino-toluene,
2-methylamino-toluene,
2-dimethylamino-toluene,
2-ethylamino-toluene,
3-amino-toluene,
3-dimethylamino-toluene,
3-ethylamino-toluene,
3-butylamino-toluene,
3-(N-ethyl-N-hydroxyethyl)-amino-toluene,
3-[N-bis-(2-hydroxyethyl)]-amino-toluene,
3-[N-ethyl-N-(2-dimethylaminoethyl)]-amino-toluene,
4-methylamino-toluene,
4-dimethylamino-toluene,
4-ethylamino-toluene,
4-diethylamino-toluene,
N-ethyl-N-benzyl-aniline,
3-(N-ethyl-N-benzyl)-amino-toluene,
xylidine,
2-iso-propyl-aniline,
2-methyl-6-ethyl-aniline,
2,6-diisopropyl-aniline,
4-dodecyl-aniline,
N,N-dimethyl-4-dodecyl-aniline,
5,6,7,8-tetrahydro-naphthylamine-(1),
1-diethylamino-naphthalene, 4,4'-diamino-dicyclohexylmethane;
optionally substituted heterocyclic amines, such as
N-propyl-morpholine,
N-hexyl-morpholine,
N-dodecyl-morpholine,
N-hexadecyl-morpholine,
N-dodecyl-piperidine,
N-hexadecyl-piperidine,
N-dodecyl-imidazole,
2-dodecyl-hydroindole,
N-dodecyl-benzimidazole,
2-dodecyl-benzimidazole,
1-($\beta$-hydroxyethyl)-2-octadecyl-imidazoline,
1-($\beta$-octadecanoylaminoethyl)-2-octadecyl-imidazoline.

Suitable primary secondary and tertiary polyamines are primarily aliphatic polyamines, such as
N-dodecyl-N',N'-dimethyl-ethylene-diamine,
N-dodecyl-N',N'-diethyl-ethylene-diamine,
N-octadecyl-N',N'-diethyl-ethylene-diamine,
N-phenyl-N',N'-dimethyl-ethylene-diamine,
N-oleyl-N',N'-dimethyl-ethylene-diamine,
N-oleyl-N',N'-diethyl-ethylene-diamine,
N-dodecyl-N',N'-dimethyl-propylene-diamine-(1,3),
N-dodecyl-N',N'-diethyl-propylene-diamine-(1,3),
N-oleyl-N',N'-dimethyl-propylene-diamine-(1,3),
N-oleyl-N',N'-diethyl-propylene-diamine-(1,3),
N-dodecyl-ethylene-triamine,
N-dodecyl-ethylene-tetramine,
N-octadecyl-ethylene-tetramine.

If dyestuff acids containing reactive groups are used, obviously, only those amines are suitable for the formation of salts or addition products, which contain no free NH-groups.

The amounts in which the dyestuff amine salts or amine addition products are added to the chlorinated hydrocarbon padding liquors may vary within wide limits according to the desired depth of colour; in general, amounts of 1 to 20 parts by weight of dyestuff per 1,000 parts by weight of padding liquor have proved satisfactory.

To prepare the padding liquors, the dyestuff amine salts or dyestuff amine addition products to be used according to the invention can be added as finished compounds; however, it is also possible first to prepare the dyestuff amine salts or amine addition products in the chlorinated hydrocarbons from their components, the dyestuff acids and the amines. In this case, dyestuff acids and amines are added to the chlorinated hydrocarbons in such a proportion that at least one basic amino group is present for every carboxylic acid and/or sulphonic acid group.

If the finished dyestuff amine salts or amine addition products are used as starting material, it has frequently proved advantageous to add them to the chlorinated hydrocarbons in the form of their solution in polar organic solvents, such as isopropanol, benzyl alcohol, phenoxy-ethanol, acetonitrile, hydroxypropionitrile, dimethyl sulphoxide, dimethyl formamide, methyl glycol acetate, diethylene glycol monoethyl ether, diethylene glycol monobutyl ether, ethylene glycol monoisopropyl ether or butyrolactone. However, the amount of polar organic solvent used for dissolving the dyestuff amine salts or amine addition products should only be such that the quantity of polar solvent in the chlorinated hydrocarbon dyebaths amounts to not more than four times the weight of the quantity of dyestuff used.

In order to improve the padding and printing properties of the dyestuff mixtures, it has also proved advantageous to add to the chlorinated hydrocarbon padding liquors 0.01 to 20 per cent by weight of water and 0.01 to 1, preferably 0.2 to 0.5, per cent by weight of emulsifiers and/or thermosol auxiliaries, referred to the weight of the chlorinated hydrocarbons, for distribution of the water and formation of a thickening or for improving the dyestuff yield.

Suitable emulsifiers or thermosol auxiliaries are commercial paraffin sulphonates, alkylbenzene sulphonates, fatty alcohol sulphates, fatty acid ethanolamides, fatty amine oxides, fatty acid amidoamine oxides and ethoxylation products of fatty alcohols, alkylphenols, fatty amines, fatty acid amides and fatty acids with 7 – 50 glycol ether radicals in the molecule and, in particular, the mixtures of these compounds.

The fibre materials of synthetic polyamides to be dyed according to the process of the invention primarily comprise fibre materials of poly-$\epsilon$-caprolactam, polyhexamethylene-diamine adipate and $\omega$-aminoundecanic acid.

The process according to the invention is advantageously carried out by spraying or impregnating the fibre materials with the chlorinated hydrocarbon dyeing liquors, squeezing them to a liquor absorption of 40 – 120% and, after an intermediate drying at, for example 80°C, subjecting them to a dry heat treatment at 190° – 220°C. A suitable dry heat treatment consists of heating for ½ – 1 minute at 190° – 195°C for textile materials of poly-$\epsilon$-caprolactam and heating for ½ – 1 minute at 210° – 220°C for polyhexamethylene-diamine adipate. After thermosolisation of the dyestuff, the non-fixed dyestuff is removed by rinsing the fibre materials in a chlorinated hydrocarbon bath which has been heated to 20° to 80°C. The adhering solvent is subsequently removed from the fibre materials by blowing with overheated steam or with air.

From Swiss Patent Specification No. 454,084 there is known a thermosol process for the continuous dyeing of textile materials of synthetic polyamides from organic solvents, in which the textile materials are dyed or printed with dyeing liquors containing disperse dyestuffs or water-soluble dyestuffs in solvent mixtures.

Compared with this process, the process according to the invention which uses special dyestuff amine salts or amine addition products which are soluble in chlorinated hydrocarbons, is superior in that it yields stronger and more brilliant dyeings and prints, since the dyestuff amine salts or addition products soluble in chlorinated hydrocarbons enable stable single-phase padding liquors of high dyestuff concentrations to be prepared, even without the use of solvents. Moreover, the use of dyestuffs soluble in chlorinated hydrocarbons enables the fibre materials to be rinsed with chlorinated hydrocarbons and thus the whole dyeing process to be carried out without the occurrence of waste water.

With the aid of the process according to the invention it is possible to produce on fibre materials of synthetic polyamides intense, level and well developed dyeings and prints with an excellent dyestuff yield and without the occurrence of waste water.

The parts given in the following Examples are parts by weight.

EXAMPLE 1

A fabric of poly-ε-caprolactam fibres is impregnated with a padding liquor consisting of
  50 parts of a dyestuff preparation consisting of
    15 parts of the dyestuff of the formula

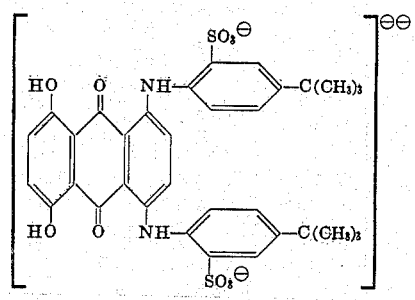

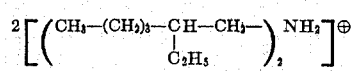

and 85 parts diethylene glycol monobutyl ether in 950 parts perchloroethylene,
subsequently dried and thermosolised at 192°C for 45 seconds. The fabric is then rinsed in perchloroethylene at 40°C for 3 minutes, and then dried by blowing with hot air. A brilliant green dyeing is obtained with a fixation yield of 98.5%, referred to the dyestuff used.

EXAMPLE 2

A knitted material of poly-ε-caprolactam filaments is impregnated with a padding liquor consisting of
  50 parts of a dyestuff preparation consisting of
    15 parts of the dyestuff of the formula

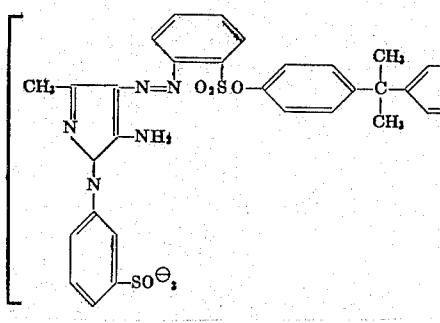

and 85 parts diethylene glycol monoethyl ether in 950 parts trichloroethylene, then dried and thermosolised at 192°C for 45 seconds. The fabric is subsequently rinsed in trichloroethylene at 40°C for 3 minutes. A brilliant yellow dyeing is obtained with a fixation yield of 90.5%, referred to the dyestuff used.

EXAMPLE 3

A knitted fabric of poly-ε-caprolactam fibres is impregnated with a padding liquor consisting of
  10 parts of the dyestuff of the formula

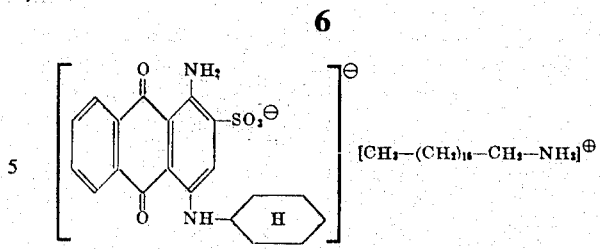

32 parts of a stock emulsion consisting of
  1 part oleyl alcohol heptadecaglycol ether
  1 part oleic acid ethanolamide
  4 parts of water and
  6 parts perchloroethylene in 958 parts perchloroethylene
then dried and thermosolised at 192°C for 45 seconds. The knitted fabric is subsequently rinsed twice in perchloroethylene at 45°C and then freed from the adhering solvent by means of hot air. A brilliant blue dyeing of good fastness properties is obtained.

EXAMPLE 4

A fabric of polyhexamethylene-diamine adipate fibres is padded with a thickened padding liquor consisting of
  20 parts of the dyestuff of the formula

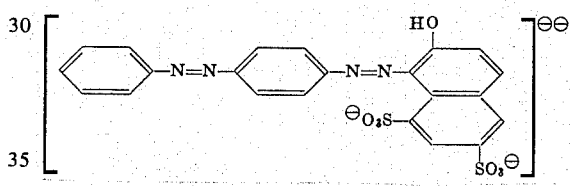

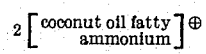

2 parts nonylphenol decaglycol ether
  80 parts of water and
  898 parts trichloroethylene,
dried at 80°C for 1 minute, thermosolised at 215°C for 1 minute, subsequently rinsed with trichloroethylene at 40°C for 3 minutes, and then dried by blowing with hot air. A level red dyeing of good fastness properties is obtained.

EXAMPLE 5

A (1:1) mixed fabric of polyhexamethylene-diamine

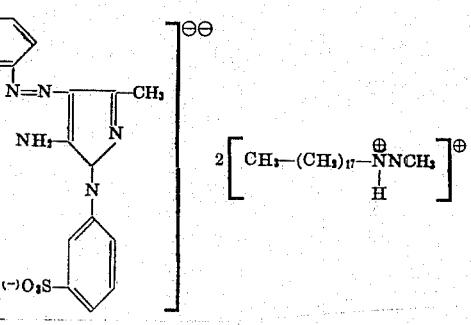

adipate fibres and regenerated cellulose fibres is padded with a padding liquor consisting of
10 parts of the dyestuff of the formula

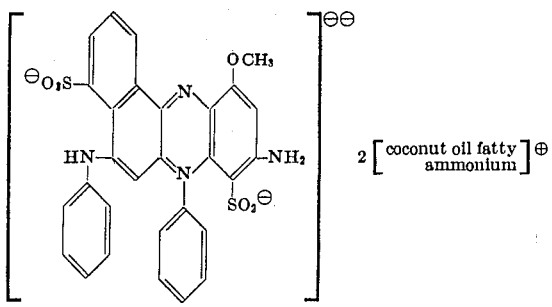

10 parts benzyl alcohol
1 part oleic acid ethanolamide
1 part oleyl alcohol eicosaglycol ether
4 parts of water and
974 parts perchloroethylene, dried at 80°C for 1 minute and thermosolised at 215°C for 1 minute. The fabric is subsequently rinsed in perchloroethylene at 45°C for 3 minutes and then freed from the adhering solvent by blowing with hot air. There is obtained a level violet dyeing of the polyamide fibre component and a well-reserved cellulose fibre component.

EXAMPLE 6

A fabric of poly-ε-caprolactam is impregnated with a padding liquor consisting of
3 parts of the fluorescent dyestuff of the formula

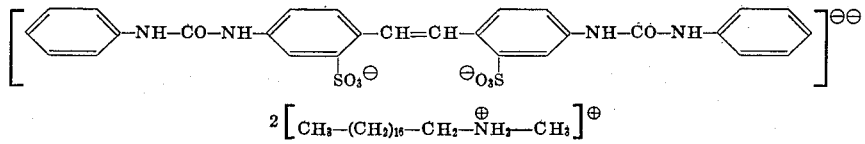

1 part oleic acid ethanolamide
1 part oleyl alcohol heptadecaglycol ether
4 parts of water and
991 parts trichloroethylene, dried and thermosolised at 192°C for 45 seconds. The fabric is subsequently rinsed in trichloroethylene at room temperature for 4 minutes, then centrifuged and freed from the adhering solvent by blowing with hot air. An intensely and uniformly brightened white fabric is obtained without the occurrence of waste water.

We claim:

1. Process for the continuous dyeing and printing of synthetic polyamide fiber material comprising the steps of
   A. applying to said synthetic polyamide fiber material dyeing or printing composition consisting essentially of a solution of
      1. a salt or addition product of an amine containing at least eight carbon atoms and having an uninterrupted chain of at least three carbon atoms, and a dyestuff containing carboxyl groups, sulfonic acid groups or both carboxyl and sulfonic acid groups; in
      2. an organic solvent having a boiling point of 30° to 190°C; said organic solvent consisting of chlorinated hydrocarbon;
   B. subjecting the synthetic polyamidefiber material to thermosolization for a period of time and at a temperature sufficient to fix the dyestuff on the fiber; and
   C. rinsing the synthetic polyamide fiber material with chlorinated hydrocarbon solvent having a boiling point of 30 to 190°C.

2. The process of claim 1 in which the fiber material is subjected to an intermediate drying step prior to the heat treatment step (B).

3. The process of claim 1 in which the dyeing composition contains in addition to the amine salt or addition product (1) and the chlorinated hydrocarbon solvent (2);
   3. 0.01 to 20% by weight of water based on the chlorinated hydrocarbon solvent; and
   4. an emulsifier.

4. The process of claim 1 in which the dyeing composition contains in addition to the amine salt or addition product (1) and the chlorinated hydrocarbon solvent (2);
   3. 0.01 to 1% by weight based on the chlorinated hydrocarbon solvent of an auxiliary selected from the group consisting of paraffin solfonates; alkylbenzene sulfonates; fatty alcohol sulfates; fatty acid ethanolamides; fatty amine oxides; fatty acid amido-amine oxides; and ethoxylation products of fatty alcohols, alkylphenols, fatty amines, fatty acid amides and fatty acids with 7–50 glycol ether radicals in the molecule; and
mixtures thereof.

5. Dyed synthetic polyamide fibers produced by the process of claim 2.

* * * * *